(12) United States Patent
Whitehouse et al.

(10) Patent No.: US 11,884,217 B2
(45) Date of Patent: Jan. 30, 2024

(54) ROTATABLE TOOL HOLDER FOR VEHICLES

(71) Applicants: Bruce Whitehouse, Milton (CA); Jaimin Shah, Milton (CA); Dennis K. Summers, Enon, OH (US); Joseph Albert, Springfield, OH (US)

(72) Inventors: Bruce Whitehouse, Milton (CA); Jaimin Shah, Milton (CA); Dennis K. Summers, Enon, OH (US); Joseph Albert, Springfield, OH (US)

(73) Assignee: INNOMOTIVE SOLUTIONS GROUP INC., Burlington (CA)

( * ) Notice: Subject to any disclaimer, the term of this patent is extended or adjusted under 35 U.S.C. 154(b) by 127 days.

(21) Appl. No.: 17/657,203

(22) Filed: Mar. 30, 2022

(65) Prior Publication Data

US 2023/0311784 A1    Oct. 5, 2023

(51) Int. Cl.
| | |
|---|---|
| *B60R 11/06* | (2006.01) |
| *B60R 21/13* | (2006.01) |
| *B60R 21/00* | (2006.01) |

(52) U.S. Cl.
CPC .............. *B60R 11/06* (2013.01); *B60R 21/13* (2013.01); *B60R 2021/0018* (2013.01)

(58) Field of Classification Search
CPC . B60R 11/06; B60R 21/13; B60R 2021/0018; H01F 7/00
USPC .............................................. 248/206.5, 503
See application file for complete search history.

(56) References Cited

U.S. PATENT DOCUMENTS

| | | | | |
|---|---|---|---|---|
| 3,980,217 | A * | 9/1976 | Yochum | B60R 11/06 224/489 |
| 4,052,864 | A * | 10/1977 | Hofsaess | A44C 17/0275 40/485 |
| 5,460,305 | A * | 10/1995 | Ahearn | B60R 11/06 224/42.31 |
| 5,937,766 | A * | 8/1999 | Denny | B60R 11/06 211/DIG. 1 |
| 6,663,073 | B1 | 12/2003 | Church | |
| 7,708,175 | B2 * | 5/2010 | Edwards | B62D 43/10 224/42.14 |
| 8,057,362 | B2 * | 11/2011 | Nadim | A63B 22/0015 482/146 |
| 8,231,163 | B1 * | 7/2012 | Dawe | B60R 11/06 296/37.1 |

(Continued)

*Primary Examiner* — Todd M Epps
(74) *Attorney, Agent, or Firm* — Husch Blackwell LLP (57) ABSTRACT

A vehicle tool rack for storing and accessing various individual equipment elements carried aboard a vehicle comprises a base and a turntable rotatably carried on the base such that the turntable is rotatable relative to the base. A plurality of tool receptacles are carried aboard the turntable, whereby the turntable is adapted to simultaneously receive a plurality of individual equipment elements. A plurality of circumferentially-spaced base magnets are fixedly carried by the base and a plurality of circumferentially-spaced turntable magnets are fixedly carried by the turntable. The base magnets and the turntable magnets remain spaced from one another. The turntable has a plurality of distinct stable rotational positions relative to the base wherein the turntable magnets interact with the base magnets to resist rotation out of the distinct stable rotational positions.

8 Claims, 11 Drawing Sheets

(56) References Cited

U.S. PATENT DOCUMENTS

| | | | |
|---|---|---|---|
| 9,751,472 B2 * | 9/2017 | Meyers | B60R 11/06 |
| 10,322,683 B2 * | 6/2019 | Lawrence | A01D 75/008 |
| 2021/0061188 A1 * | 3/2021 | Morris | B60R 11/06 |

* cited by examiner

ROTATABLE TOOL HOLDER FOR VEHICLES

FIELD OF INVENTION

The present invention relates generally to a tool holder for vehicles, specifically a rotatable tool holder for vehicles.

BACKGROUND OF THE INVENTION

Emergency vehicles such as fire engines carry an array of tools, and emergency situations require quick access to such tools. For example, in an emergency situation, where access to rescue tools (e.g. the Jaws of Life® hydraulically powered rescue tools offered by Hurst Jaws of Life, Inc., among others) seconds may make the difference between life and death for an accident victim. Emergency tools are commonly held on rotatable tool holders in specialized compartments on emergency vehicles, with a releasable mechanical lock being used to inhibit rotation of a turntable of the tool holder while the vehicle is in motion. The mechanical lock is typically biased into a locking configuration, and a user would hold the mechanical lock in an unlocked configuration against the bias while rotating the turntable to access the desired tool. Releasing the lock adds precious seconds to the time required to access an inwardly rotated tool, and there is a risk of over-rotation of the turntable placing the sought-after tool out of reach again, adding still more time to the process.

SUMMARY OF THE INVENTION

In one aspect, a vehicle tool rack for storing and accessing various individual equipment elements carried aboard a vehicle is provided. The vehicle tool rack comprises a base and a turntable rotatably carried on the base, the turntable being rotatable relative to the base. A plurality of tool receptacles are carried aboard the turntable, whereby the turntable is adapted to simultaneously receive a plurality of individual equipment elements. A plurality of circumferentially-spaced base magnets are fixedly carried by the base and a plurality of circumferentially-spaced turntable magnets are fixedly carried by the turntable. The base magnets and the turntable magnets remain spaced from one another. The turntable has a plurality of distinct stable rotational positions relative to the base wherein the turntable magnets interact with the base magnets to resist rotation of the turntable relative to the base out of the distinct stable rotational positions.

In some embodiments, in each of the plurality of distinct stable rotational positions of the turntable relative to the base, the turntable magnets are in registration with the base magnets and the turntable magnets are in polar opposition to the base magnets.

The vehicle tool rack may further comprise a weight driven mechanism acting between the base and the turntable for reducing the distance between the base magnets and the turntable magnets as equipment weight increases. In some embodiments, the weight driven mechanism comprises at least one compression spring.

In some embodiments, the base magnets and the turntable magnets are located in registration with respective ones of the tool receptacles.

In some embodiments, the tool receptacles comprise a releasable tool restraint.

In another aspect, a method of carrying tools on a vehicle tool rack is described. The method comprises carrying a plurality of tools on a turntable, the turntable being rotatably carried by a base so as to be rotatable relative to the base, and, absent an external user-applied torque above a threshold, maintaining the turntable in one of a plurality of distinct stable rotational positions relative to the base by interaction of magnetic force between base magnets fixedly carried by the base and turntable magnets fixedly carried by the turntable.

The method may further comprising decreasing a vertical distance between the turntable magnets and the base magnets as a weight of the tools increases.

BRIEF DESCRIPTION OF THE DRAWINGS

These and other features of the invention will become more apparent from the following description in which reference is made to the appended drawings wherein.

DETAILED DESCRIPTION

Figure 5:
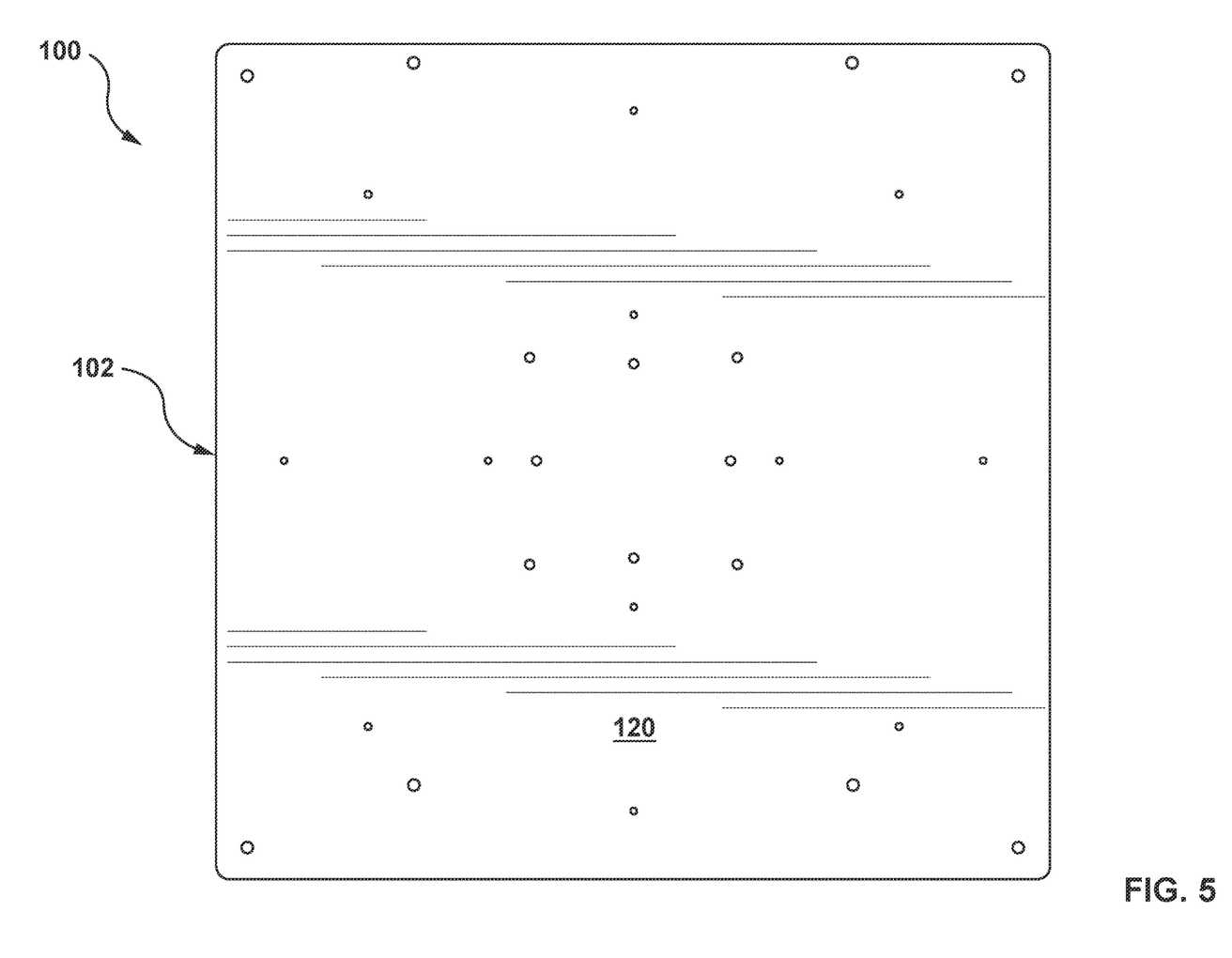
FIG. 5 is a bottom plan view of the vehicle tool rack of FIG. 1.
Figure 6:
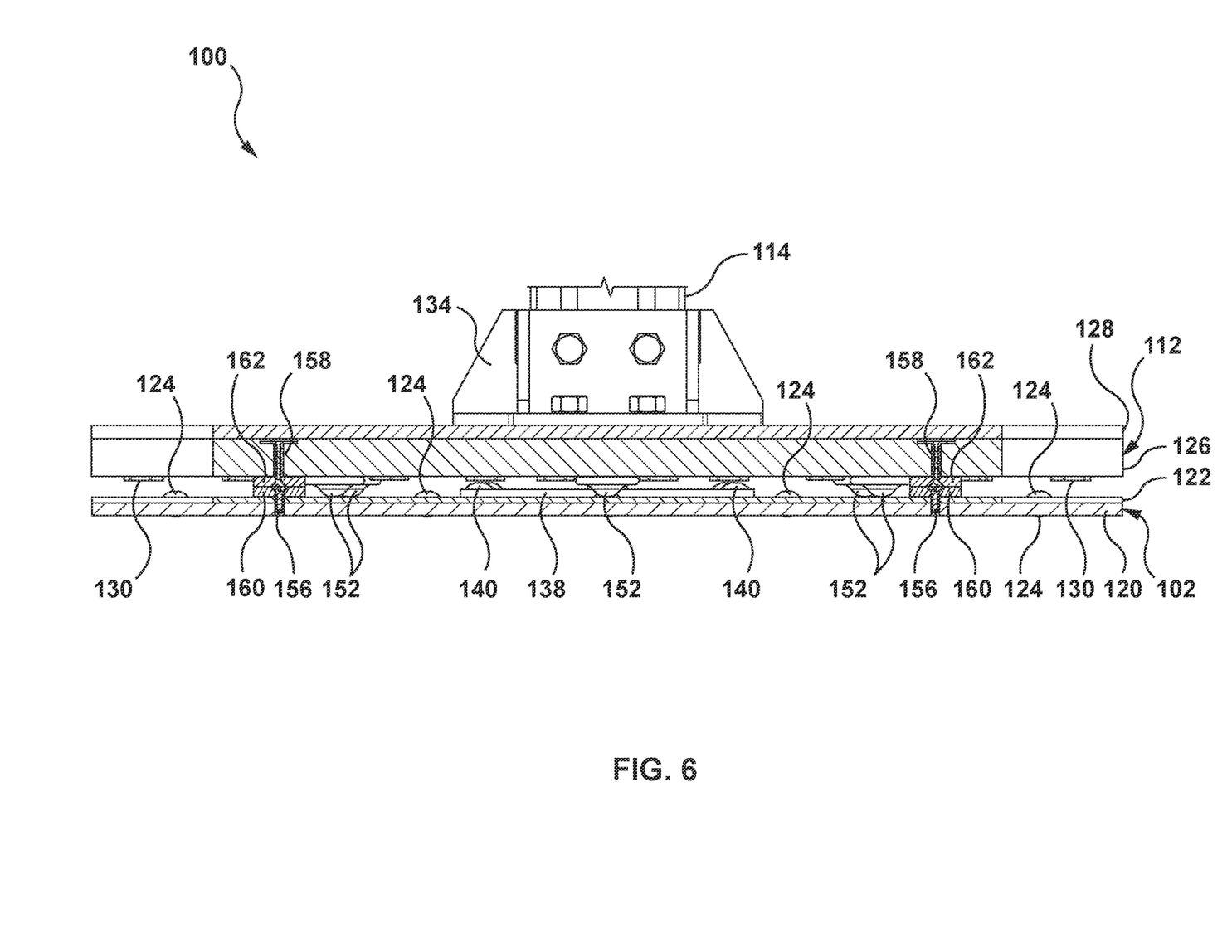
FIG. 6 shows a cross-sectional view of the vehicle tool rack of FIG. 1 taken along line FIG. 6-FIG. 6 in FIG. 1.
Figure 7:
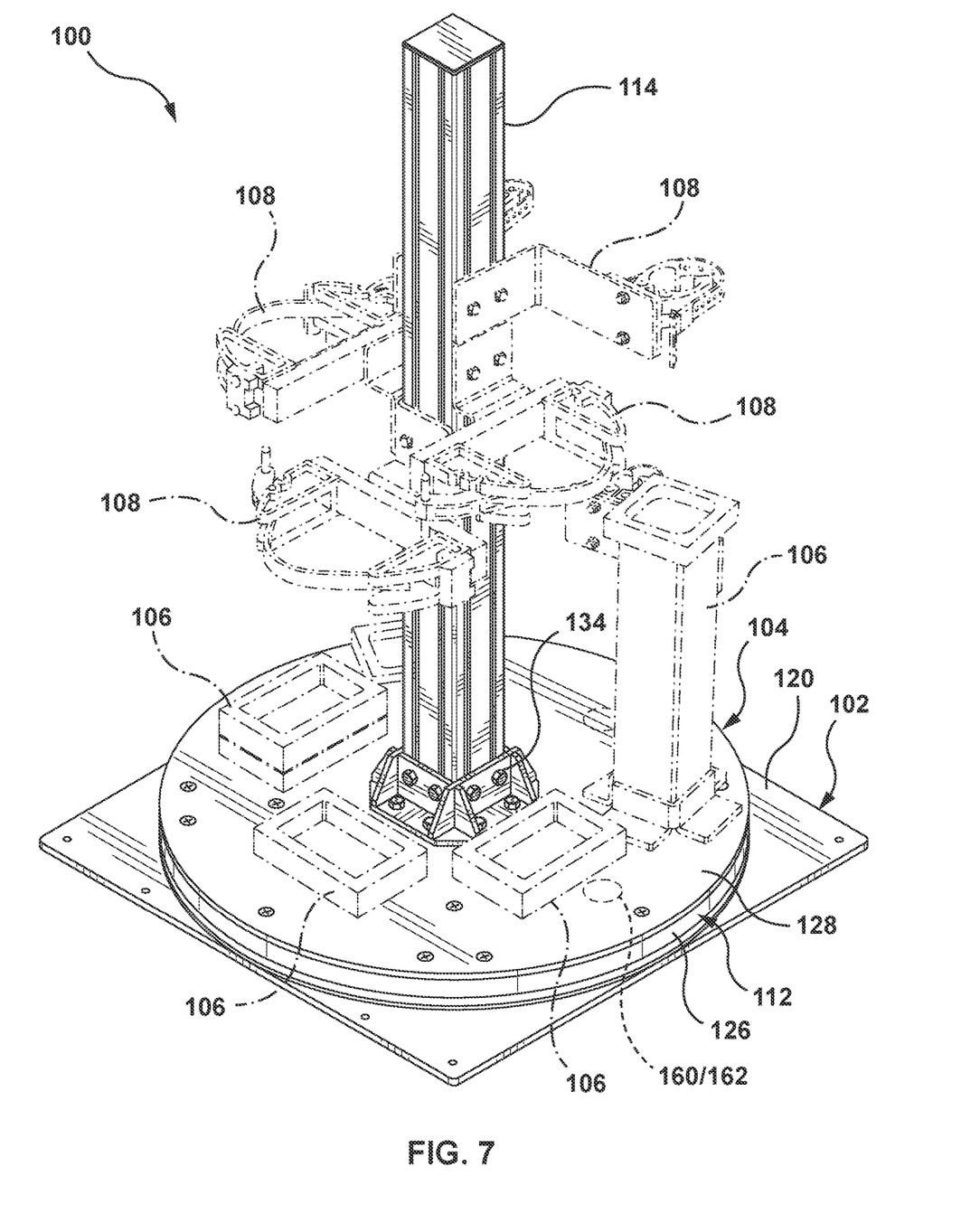
FIG. 7 shows a top perspective view of the vehicle tool rack of FIG. 1 with illustrative tool receptacles.
Figure 8:
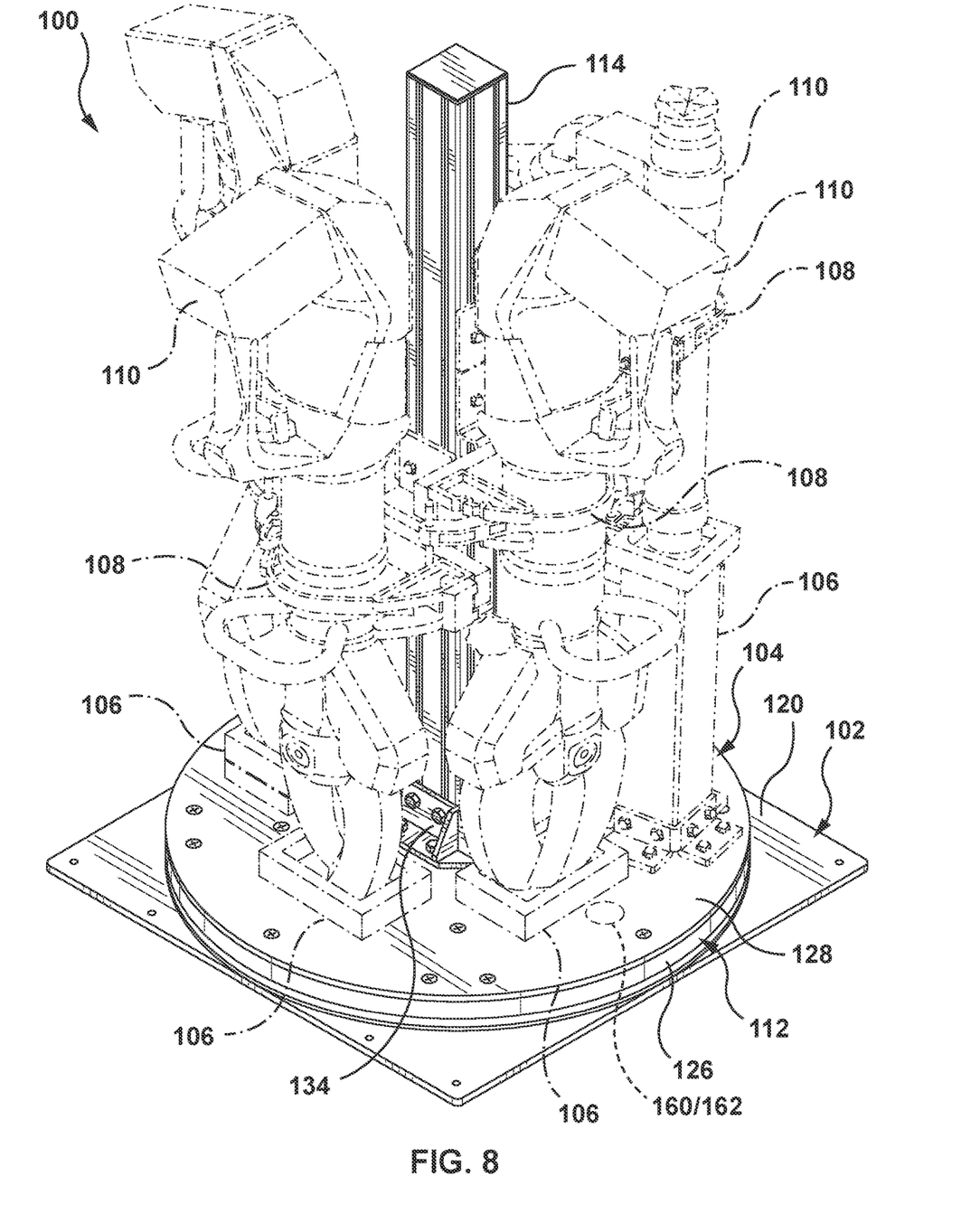
FIG. 8 shows a top perspective view of the vehicle tool rack of FIG. 7 having illustrative equipment elements carried by the illustrative tool receptacles.

Reference is made to the figures throughout. In one aspect of the current disclosure, a vehicle tool rack 100 is provided for storing and accessing various individual equipment elements carried aboard a vehicle. The tool rack 100 comprises a base 102, a turntable 104, and a plurality of tool receptacles carried aboard the turntable 104. FIGS. 1 to 6 show the tool rack 100 without the tool receptacles 106, 108, to facilitate understanding of operation of the tool rack 100; illustrative tool receptacles 106, 108 are shown in FIGS. 7 and 8. By way of the tool receptacles 106, 108, the turntable 104 is adapted to simultaneously receive a plurality of individual equipment elements 110, as shown in FIG. 8.

Figure 1:
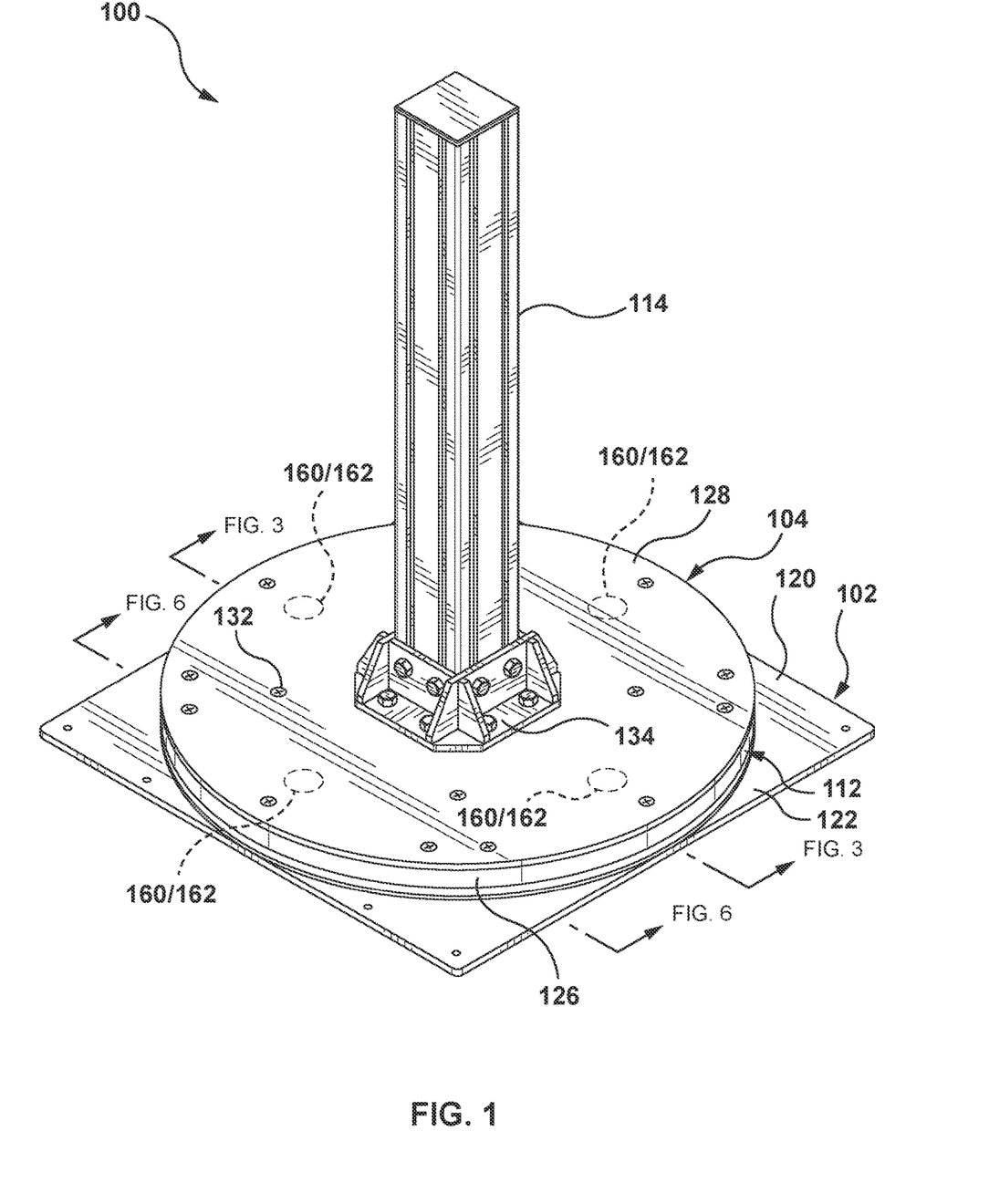
FIG. 1 is a perspective view of an illustrative vehicle tool rack according to an aspect of the present disclosure, shown without tool receptacles for purposes of illustration.
Figure 2:
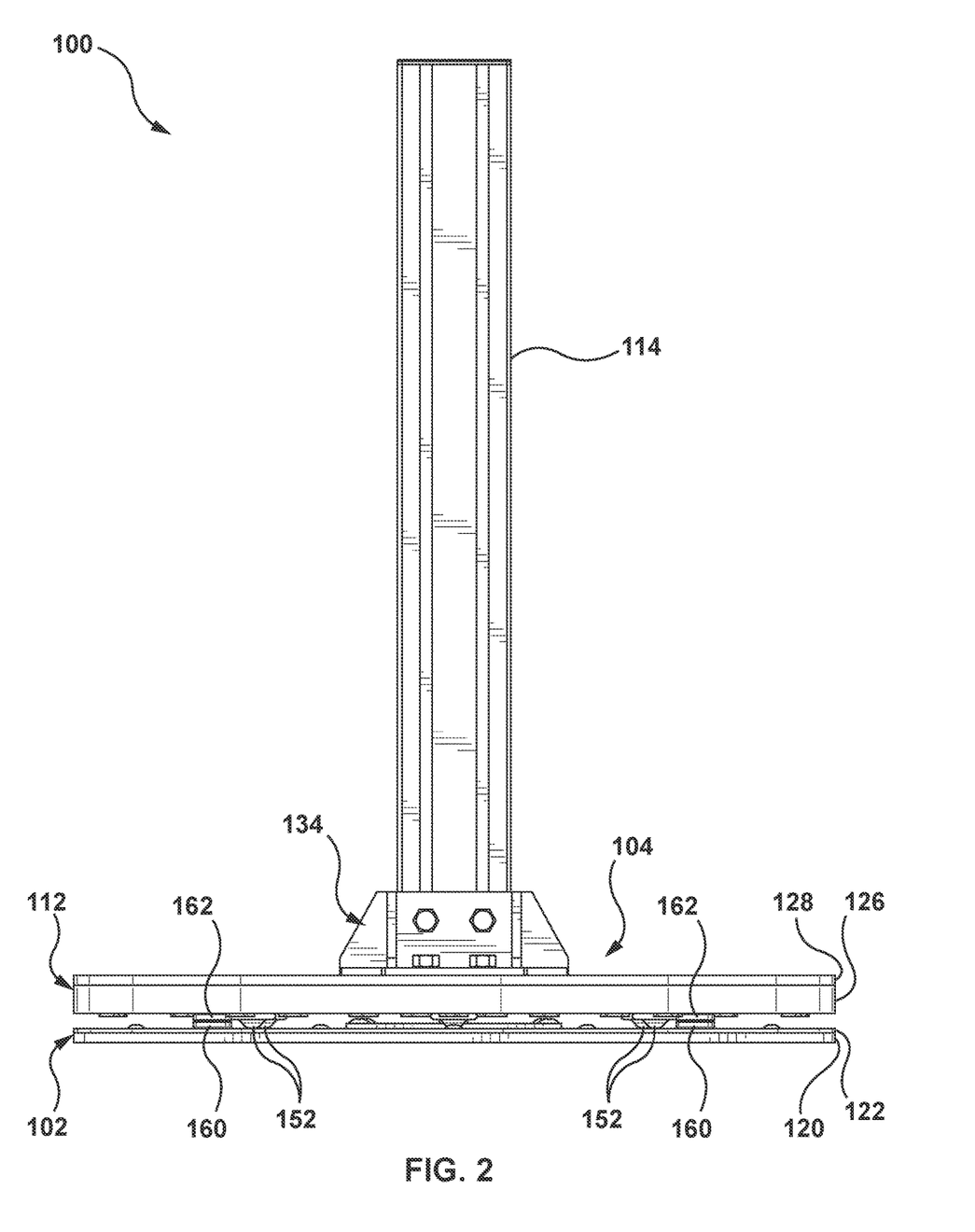
FIG. 2 is a side elevation view of the vehicle tool rack of FIG. 1.

The turntable 104 is rotatably carried on the base 102 such that the turntable 104 is rotatable relative to the base 102, and the tool receptacles 106, 108 rotate with the turntable 104. These equipment elements could be, for example, forceful-entry tools, nozzles, hydrant connection adaptors, EMS equipment or the like for emergency rescue operations, and may include, without limitation, any tools found, for example, in fire engines. The terms "tool" and "equipment element" are used synonymously herein. The tool receptacles 106, 108 as shown in FIGS. 6 and 7 represent merely one possible configuration of tool receptacles shown for purposes of illustration and without implying any limitation, a wide array of different configurations for tool receptacles is contemplated within the scope of the present disclosure. In the illustrated embodiment, as best seen in FIGS. 1 and 2, the turntable 104 includes a platter 112 and an upstanding support column 114 extending from the platter 112, and as shown in FIG. 7 the tool receptacles 106, 108 comprise lower tool receptacles 106 disposed on the platter 112 and upper tool receptacles disposed on the support column 114.

Figure 3A:
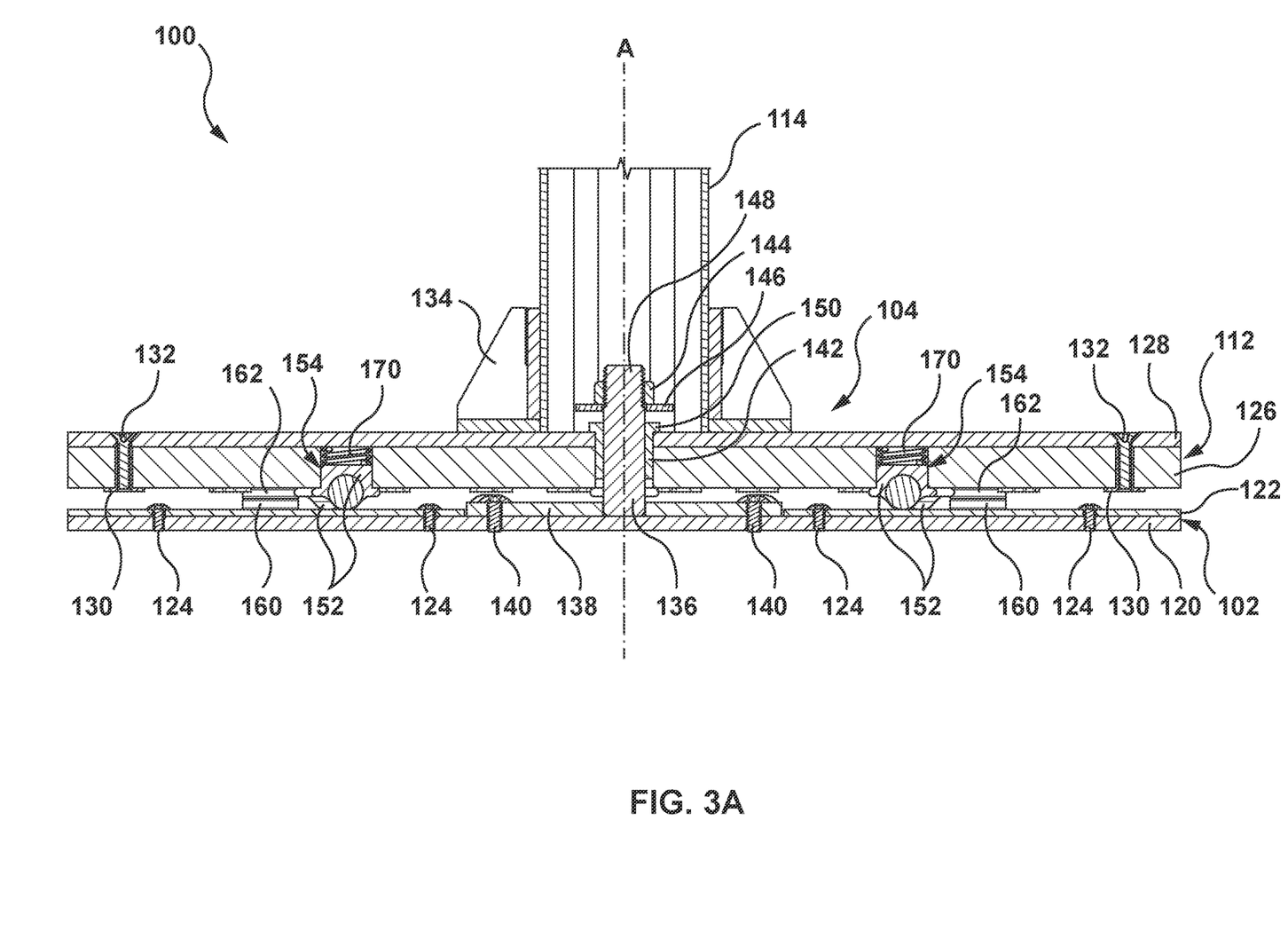
FIG. 3A is a cross-sectional view of the vehicle tool rack of FIG. 1 taken along line FIG. 3-FIG. 3 in FIG. 1 with springs thereof in a compressed position under a relatively heavier load.
Figure 3B:
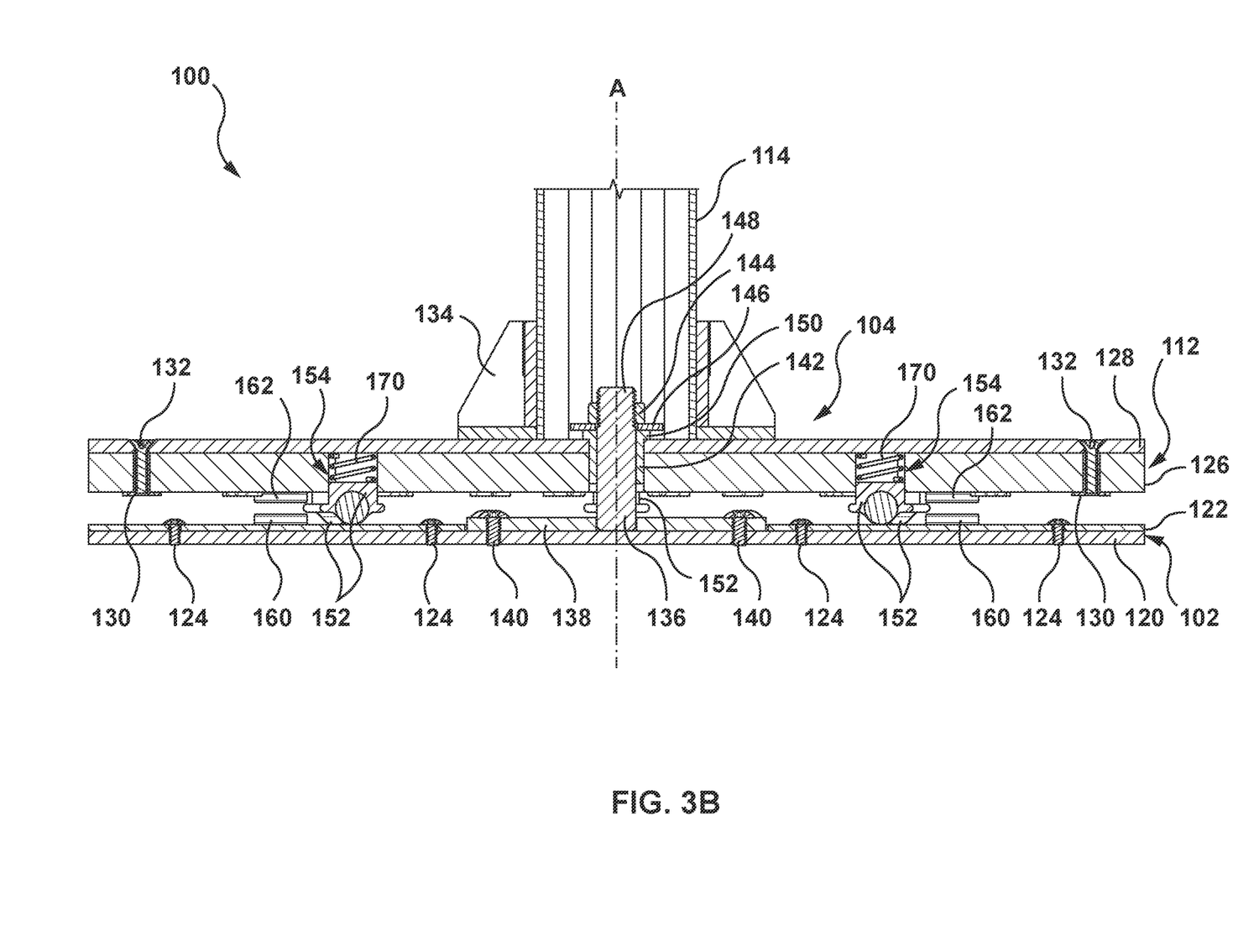
FIG. 3B is a cross-sectional view of the vehicle tool rack of FIG. 1 taken along line FIG. 3-FIG. 3 in FIG. 1 with springs thereof in an expanded position under a relatively lighter load.

Reference is now made specifically to FIGS. 3A and 3B. In the illustrated embodiment, the base 102 comprises a lower base layer 120 of 6000 series aluminum and an annular upper base layer 122 of ⅛ inch stainless steel; the lower base layer 120 and the upper base layer 122 are secured to one another by bolts 124. These materials and fasteners are merely illustrative and no limitation is implied. FIG. 5 shows a bottom plan view of the base 102, specifically the lower base layer 120. Returning to FIGS. 3A and 3B, the platter 112 comprises a lower platter layer 126 of polypropylene, preferably ultra-high molecular weight (UHMW) polypropylene, and an upper platter layer 128 of aluminum. The lower platter layer 126 and the upper platter layer 128 are secured to one another by plywood T-nuts 130 received in respective bores in the lower platter layer 126 and screws or bolts 132 passing through correspondingly positioned bores in the upper platter layer 128. Again, these materials and fasteners are merely illustrative and no limitation is implied. The support column 114 is formed from aluminum or another suitable material and is supported on the upper platter layer 128 by an angle bracket assembly 134 secured to the support column 114 and the upper platter layer 128.

As noted above, the turntable 104 is rotatably carried on the base 102. In the illustrated embodiment, an axle 136 is welded at its lower end to a support plate 138 of ¼ inch steel, which is secured to the lower base layer 120 by bolts 140. The axle 136 is rotatably journalled in a collared bronze bushing 142 which is slip fit on the axle 136; the bushing 142 has a clearance fit into a central aperture in the platter 112. The bushing 142, and hence the turntable 104, is captured against the base 102 by way of a nut 144 and washer 146. More particularly, the nut 144 and washer 146 are received on the threaded upper end 148 of the axle 136 and cooperate with the collar 150 of the bushing 142 to limit travel of the bushing 142 along the axle 136. The nut 144 and washer 146, in cooperation with the collar 150 of the bushing 142, limits travel of the platter 112 along the axle 136. A suitable bearing may be used instead of the bushing 142 to further reduce friction during rotation. Again, the recited materials are merely illustrative and not limiting.

Preferably, the turntable 104 rides on bearings as the turntable 104 rotates relative to the base 102. In the illustrated embodiment, a plurality of roller bearings 152 are received in corresponding recesses 154 in the lower platter layer 126. Alternatives to the roller bearings 152 may also be used. For example, a wheeled ring may be interposed between the base and the turntable, with the wheels riding within a circular track formed in the upper base layer and/or the lower platter layer in a "lazy Susan" arrangement.

Of note, a plurality of circumferentially-spaced base magnets 160 are fixedly carried by the base 102 and a plurality of circumferentially-spaced turntable magnets 162 are fixedly carried by the turntable 104. In the illustrated embodiment, the base magnets 160 are positioned atop the base 102 on the upper surface of the upper base layer 122 and the turntable magnets 162 are positioned on the underside of the platter 112 on the lower surface of the lower platter layer 126. As shown in FIG. 6, the base magnets 160 are secured to the base 102 by bolts 156 and the turntable magnets 162 are secured to the turntable 104 by screws 158. Other configurations are also possible. For example, the base magnets 160 and/or the turntable magnets 162 may be recessed within the base 102 and/or the turntable 104, respectively, so as to be flush-mounted, and in a recessed embodiment the base magnets 160 and/or the turntable magnets 162 may be adhered rather than bolted/screwed.

Continuing to refer to FIGS. 3A and 3B, the base magnets 160 and the turntable magnets 162 are spaced from one another. The turntable 104 has a plurality of distinct stable rotational positions relative to the base 102, in which the turntable magnets 162 interact with the base magnets 160 to resist rotation of the turntable 104 relative to the base 102 out of the distinct stable rotational positions. According to one aspect of the disclosure, the turntable magnets 162 are in polar opposition to the base magnets 160 and the distinct stable rotational positions of the turntable 104 relative to the base 102 are rotational positions in which the turntable magnets 162 are in registration with the base magnets 160 and the base magnets 160 attract the turntable magnets 162. For example, the base magnets 160 may be oriented with their north poles (N) facing toward the turntable 104 and the turntable magnets 162 may be oriented with their south poles (S) facing toward the base 102 such that the turntable magnets 162 are in polar opposition to the base magnets 160. Thus, the base magnets 160 have their north poles (N) facing the south poles (S) of the turntable magnets 162. Alternatively, the respective orientations may be reversed such that the base magnets 160 have their south poles (S) facing the north poles (N) of the turntable magnets 162.

In such embodiments, when the turntable magnets 162 are in registration with the base magnets 160, magnetic attraction between the turntable magnets 162 and the oppositely oriented base magnets 160 will resist rotation of the turntable 104 relative to the base 102. Therefore, the turntable 104 may be maintained in one of the distinct stable rotational positions when the turntable magnets 162 and the oppositely oriented base magnets 160 are in registration. A user may rotate the turntable 104 relative to the base 102 by applying sufficient mechanical force (torque) to overcome the magnetic force acting between the turntable magnets 162 and the base magnets 160. Once the turntable 104 has rotated more than half the distance between the initial rotational position and the next rotational position (in the direction of rotation), the magnetic force acting between the turntable magnets 162 and the base magnets 160 urges the turntable 104 toward that next rotational position relative to the base 102.

In the illustrated embodiment, there are four base magnets 160 and four turntable magnets 162, with the base magnets 160 and the turntable magnets 162 positioned at 90 degree intervals. In this arrangement, there will be four distinct stable rotational positions in which the turntable magnets 162 are in registration with the base magnets 160, with each rotational position being 90 degrees apart from each adjacent rotational position. This arrangement is suitable where there are four equipment elements 110 (see FIG. 8). As shown in FIGS. 7 and 8, the support column 114 has four faces, with each face aligned with one of the four distinct stable rotational positions, so that each of the distinct stable rotational positions will present a particular one of the equipment elements 110. In this embodiment, the turntable magnets 162 may be in registration with the tool receptacles 106, 108.

By having more or fewer than four base magnets 160 and more or fewer than four turntable magnets 162, the number of distinct stable rotational positions can be increased or decreased, as desired, and the number of faces on the support column may be increased or decreased. The number of faces on the support column need not be equal to the number of distinct stable rotational positions; the support column optionally may not have faces but may be cylindrical.

It is also contemplated that there may be a plurality of base magnets and only a single turntable magnet, or a plurality of turntable magnets and only a single base magnet. In such an embodiment, the distinct stable rotational positions are where respective ones of the plurality of magnets are in registration with the single magnet.

Figure 4A:
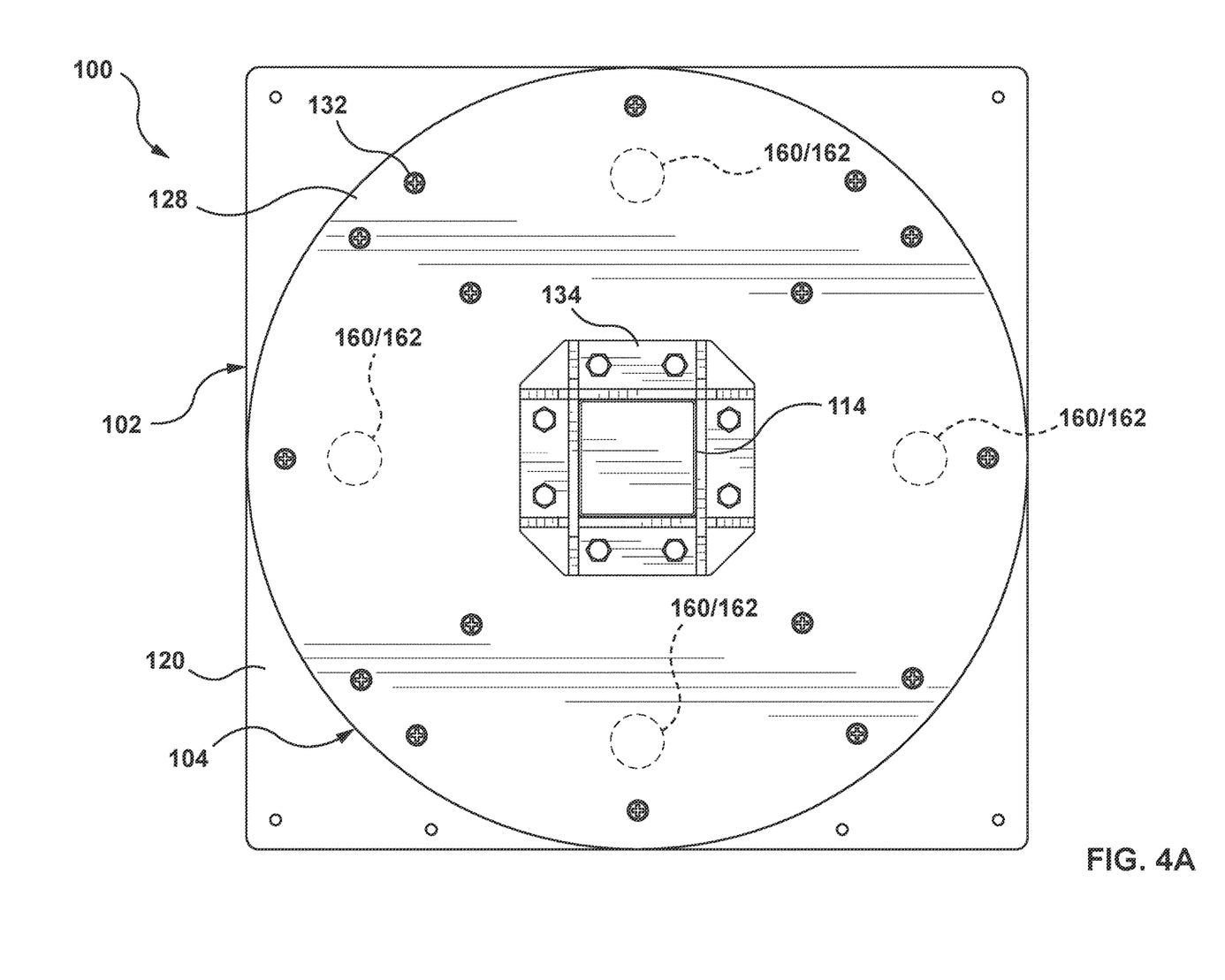
FIG. 4A is a top plan view of the vehicle tool rack of FIG. 1 with magnets thereof in a first radial position.
Figure 4B:
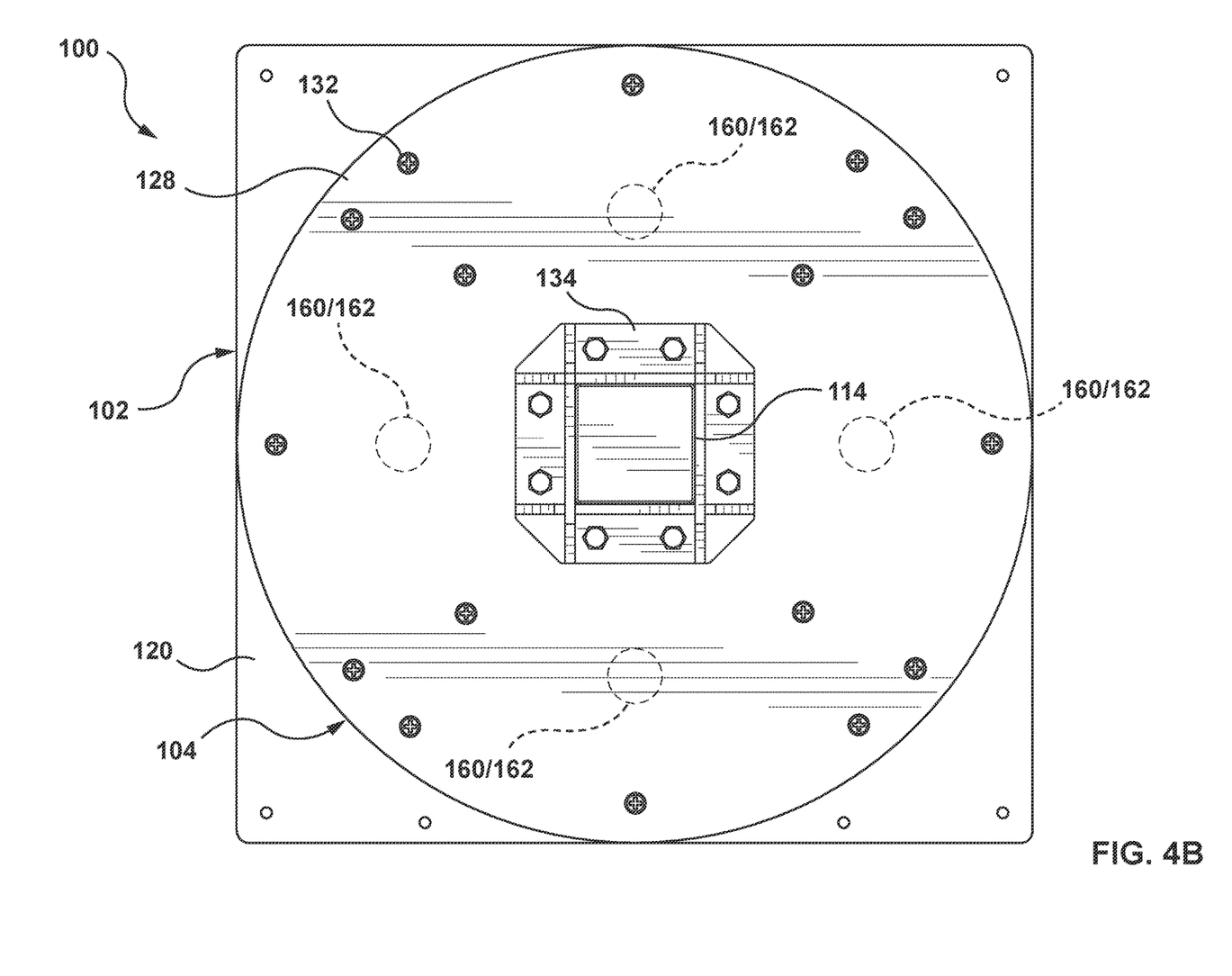
FIG. 4B is a top plan view of the vehicle tool rack of FIG. 1 with the magnets thereof in a second radial position.
Figure 4C:
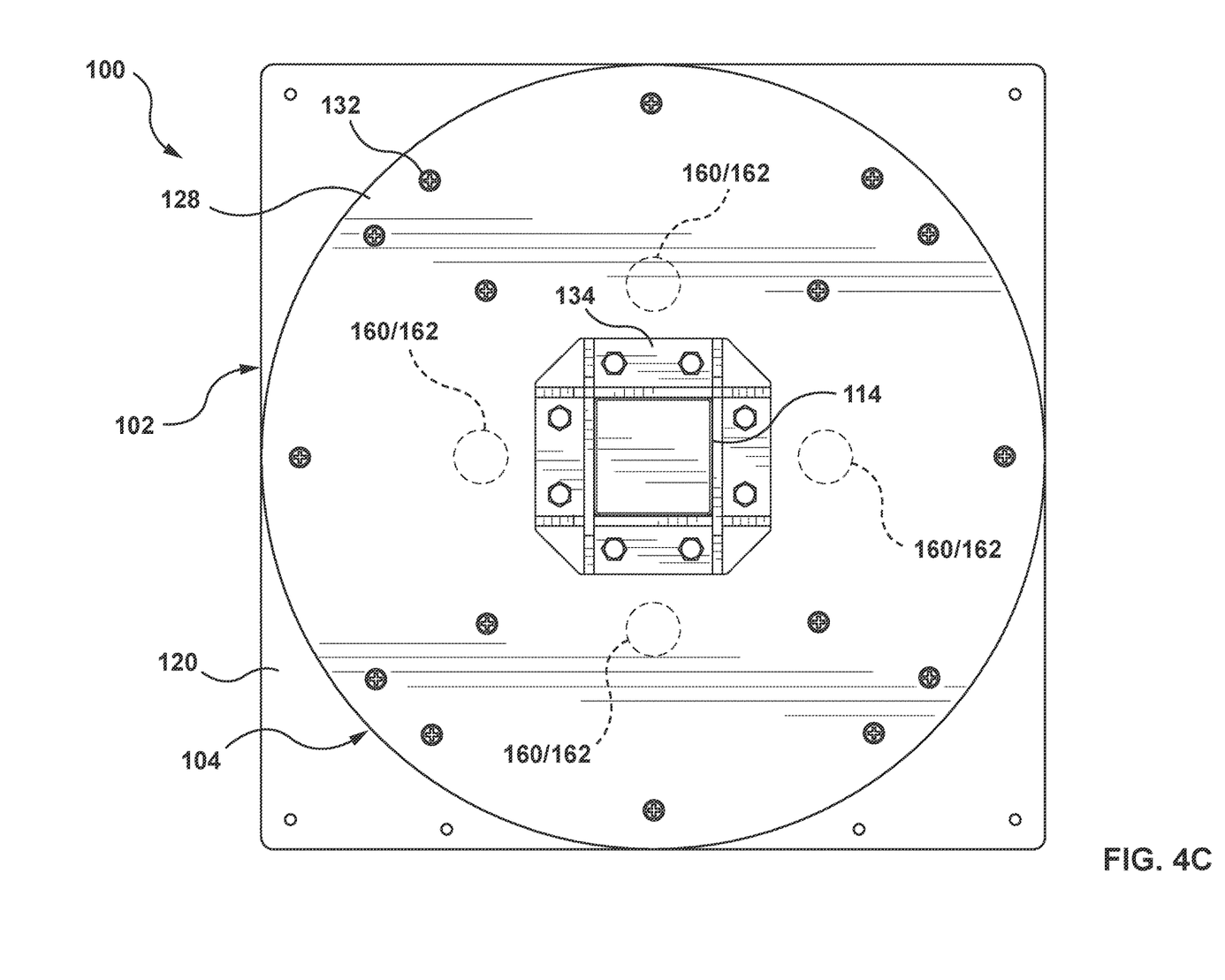
FIG. 4C is a top plan view of the vehicle tool rack of FIG. 1 with the magnets thereof in a third radial position.

Reference is now made to FIGS. 4A through 4C. The base magnets 160 and the turntable magnets 162 may have a variety of radial positions, relative to the axis of rotation A of the turntable 104 relative to the base 102 (see FIGS. 3A and 3B), on the base 102 and turntable 104 so long as they are of equal radial distance from the axis A so that the base magnets 160 and the turntable magnets 162 can magnetically interact. FIG. 4A shows the base magnets 160 and the turntable magnets 162 relatively further from the axis A, FIG. 4C shows the base magnets 160 and the turntable magnets 162 relatively closer to the axis A, and FIG. 4B shows the base magnets 160 and the turntable magnets 162 positioned intermediately, relative to the positions in FIGS. 4A and 4C. The radial positions of the base magnets 160 and the turntable magnets 162 will affect the amount of torque required to overcome the resistance of the base magnets 160 and the turntable magnets 162 and rotate the turntable 104 relative to the base 102. It is contemplated that in some embodiments, the radial positions of the base magnets and the turntable magnets may be adjustable; for example the magnets may ride within radially extending tracks in the base and in the turntable. In such an embodiment, the radial positions of the base magnets and the turntable magnets would be adjusted to be of equal radial distance from the axis so as to remain in registration with one another.

In another embodiment, the distinct stable rotational positions of the turntable 104 relative to the base 102 are rotational positions in which the turntable magnets 162 are out of registration with the base magnets 160 and the base magnets 160 repel the turntable magnets 162. For example, the base magnets 160 may be oriented with their north poles (N) facing toward the turntable 104 and the turntable magnets 162 may also be oriented with their north poles (N) facing toward the base 102. Thus, the base magnets 160 have their north poles (N) facing the north poles (N) of the turntable magnets 162. Alternatively, the respective orientations may be reversed such that the base magnets 160 have their south poles (S) facing the south poles (S) of the turntable magnets 162. In either the N-N or the S-S configurations, there are equal numbers of the base magnets 160 and the turntable magnets 162, each with equal circumferential spacing. The distinct stable rotational positions occur where the base magnets 160 are positioned circumferentially between the turntable magnets 162 and the turntable magnets 162 are positioned circumferentially between the base magnets 160. Repulsion between the base magnets 160 and the turntable magnets 162 will maintain the turntable 104 in a given one of the distinct stable rotational positions; each of the turntable magnets 162 "hover" between adjacent pairs of the base magnets 160. More particularly, repulsion between adjacent pairs of base magnets 160 will trap the turntable magnets 162 between the pairs of base magnets to hold the turntable 104 in position. A user may rotate the turntable 104 relative to the base 102 by applying sufficient mechanical force (torque) to overcome the magnetic force acting between the turntable magnets 162 and the base magnets 160.

In one preferred embodiment, the vehicle tool rack 100 further comprises a weight driven mechanism acting between the base 102 and the turntable 104 for reducing the distance between the base magnets 160 and the turntable magnets 162 as the weight of the individual equipment elements 110 (FIG. 8) increases.

Reference is now made again to FIGS. 3A and 3B. In one illustrative embodiment, the weight driven mechanism comprises a plurality of compression springs 170 disposed within the recesses 154 in the lower platter layer 126 and acting between the turntable 104, specifically the upper platter layer 128, and the roller bearings 152. Where the weight of the individual equipment elements 110 (FIG. 8) is relatively greater, the compression springs 170 will be relatively more compressed. This results in the turntable 104 being relatively closer to the base 102, and the distance between the base magnets 160 and the turntable magnets 162 will be relatively smaller, as shown in FIG. 3A. This results in relatively greater magnetic force acting between the base magnets 160 and the turntable magnets 162. Although the base magnets 160 and the turntable magnets 162 are very close together in the configuration shown in FIG. 3A, in the illustrated embodiment the base magnets 160 and the turntable magnets 162 remain spaced from one another. Conversely, where the weight of the individual equipment elements 110 (FIG. 8) is relatively smaller, the compression springs 170 will be relatively compressed so that the turntable 104 is relatively further from the base 102. This results in a relatively greater distance between the base magnets 160 and the turntable magnets 162, as shown in FIG. 3B, in turn resulting in relatively smaller magnetic force acting between the base magnets 160 and the turntable magnets 162. Thus, as the weight of the individual equipment elements 110 increases, so too does the magnetic force that resists rotation of the turntable 104 relative to the base 102.

The configuration shown in FIGS. 3A and 3B is merely illustrative and not limiting. For example, in another embodiment a single compression spring may be disposed concentrically around the axle, with suitable adaptation of the bushing and related components. Moreover, a weight driven mechanism according to the present disclosure is not limited to compression springs or even to springs, and may include, for example, one or more piston-cylinder assemblies, or electromechanical arrangements, for example a load cell sensor cooperating with a rack and pinion assembly. Furthermore, the weight driven mechanism need not move the turntable closer to the base as the weight increases, but need only move the turntable magnets closer to the base magnets. For example, a weight driven mechanism may move the turntable magnets closer to the base magnets even as the turntable remains at a constant distance from the base.

Thus, in one aspect, the present disclosure describes a method of carrying tools on a vehicle tool rack. A plurality of tools (equipment elements 110) are carried on a turntable 104 that is rotatably carried by a base 102 so as to be rotatable relative to the base 102 (see FIG. 8). Absent an external user-applied torque above a threshold sufficient to exceed the magnetic force, the turntable 104 is maintained in one of a plurality of distinct stable rotational positions relative to the base 102 by interaction of magnetic force between the base magnets 160 fixedly carried by the base and the turntable magnets 162 fixedly carried by the turntable 104. The method may further comprise decreasing a vertical distance between the turntable magnets 162 and the base magnets 160 as the weight of the tools increases.

As noted above, with reference again to FIGS. 7 and 8, the support column 114 extends from the platter 112, and the tool receptacles 106, 108 comprise lower tool receptacles 106 disposed on the platter 112 and upper tool receptacles disposed on the support column 114. The lower tool receptacles 106 generally comprise rectangular prismatic open-topped walls, and the upper tool receptacles 108 generally comprise releasable tool restraints, such as straps or clamps. Thus, the equipment elements 100 may be secured on the turntable 104 by having the lower ends thereof disposed within and restrained by the lower tool receptacles 106 and the upper ends thereof trapped within and restrained by the upper tool receptacles 108. The tool receptacles 106, 108 are merely illustrative and not limiting; a wide range of tool receptacles may be used without departing from the scope of the present disclosure. Similarly, no limitation is implied as to the types of equipment elements 110 that may be carried on the turntable 104; the turntable may carry tools of any kind.

In another embodiment of the present disclosure, the vehicle tool rack 100 could further include a releasable latching mechanism (not shown) interposed between the base 102 and the turntable 104 that is adapted to mechanically lock the turntable 104 against rotation relative to the base 102, independent of the base magnets 160 and the turntable magnets 162. Various latching mechanisms will be known to one with skill in the art. In one embodiment, the latch may be electromechanically controlled so as to be automatically disengaged when a fire engine is placed in "park" upon arrival at an emergency so as not to delay access to the equipment elements.

One or more currently preferred embodiments have been described by way of example. It will be apparent to persons skilled in the art that a number of variations and modifications can be made without departing from the scope of the claims.

What is claimed is:

1. A vehicle tool rack for storing and accessing various individual equipment elements carried aboard a vehicle, the vehicle tool rack comprising:
    a base;
    a turntable rotatably carried on the base, the turntable being rotatable relative to the base;
    a plurality of tool receptacles carried aboard the turntable, whereby the turntable is adapted to simultaneously receive a plurality of individual equipment elements;
    a plurality of circumferentially-spaced base magnets fixedly carried by the base; and
    a plurality of circumferentially-spaced turntable magnets fixedly carried by the turntable;
    wherein the base magnets and the turntable magnets remain spaced from one another; and
    wherein the turntable has a plurality of distinct stable rotational positions relative to the base wherein the turntable magnets interact with the base magnets to resist rotation of the turntable relative to the base out of the distinct stable rotational positions.

2. The vehicle tool rack of claim 1, wherein, in each of the plurality of distinct stable rotational positions of the turntable relative to the base:
    the turntable magnets are in registration with the base magnets; and
    the turntable magnets are in polar opposition to the base magnets.

3. The vehicle tool rack of claim 1, further comprising a weight driven mechanism acting between the base and the turntable for reducing the distance between the base magnets and the turntable magnets as equipment weight increases.

4. The vehicle tool rack of claim 3, wherein the weight driven mechanism comprises at least one compression spring.

5. The vehicle tool rack of claim 1, wherein the base magnets and the turntable magnets are located in registration with respective ones of the tool receptacles.

6. The vehicle tool rack of claim 1, wherein the tool receptacles comprise a releasable tool restraint.

7. A method of carrying tools on a vehicle, the method comprising:
    carrying a plurality of tools on a turntable, the turntable being rotatably carried by a base so as to be rotatable relative to the base; and
    absent an external user-applied torque above a threshold, maintaining the turntable in one of a plurality of distinct stable rotational positions relative to the base by interaction of magnetic force between base magnets fixedly carried by the base and turntable magnets fixedly carried by the turntable.

8. The method of claim 7, further comprising decreasing a vertical distance between the turntable magnets and the base magnets as a weight of the tools increases.

* * * * *